INVENTOR.
NILS HERBERT EDSTRÖM
BY Hane and Nydick
ATTORNEYS

Nov. 19, 1968 N. H. EDSTROM 3,412,210

LINE CIRCUIT HAVING SOLID STATE MEANS WITH MARKER FOR ESTABLISHING CONNECTIONS

Filed July 12, 1965 2 Sheets-Sheet 2

INVENTOR.
NILS HERBERT EDSTRÖM
BY Hane and Nydick
ATTORNEYS

United States Patent Office 3,412,210

Patented Nov. 19, 1968

3,412,210

LINE CIRCUIT HAVING SOLID STATE MEANS WITH MARKER FOR ESTABLISHING CONNECTIONS

Nils Herbert Edstrom, Vallingby, Sweden, assignor to Telefonaktiebolaget L M Ericsson, Stockholm, Sweden, a corporation of Sweden Filed July 12, 1965, Ser. No. 471,268

Claims priority, application Sweden, Sept. 11, 1964, 10,879/64

3 Claims. (Cl. 179—18)

ABSTRACT OF THE DISCLOSURE

An automatic telephone exchange including at least one marker for establishing connections. Each wire in a subscriber's two-wire line includes a memory which can be transformed from a high resistance condition to a low resistance condition by means of a current pulse with a slowly decreasing trailing flank and from a low resistance condition to a high resistance condition by means of a current pulse with a steeply decreasing time curve. The memories are included in a circuit network which connects the terminals of a source of current through the subscriber's line and comprises a resistance across which the voltage drop at the low resistance condition of the memories causes a calling potential. The presence of such potential indicates to the marker the occurrence of a call. When the memories are in their high resistance condition the network is blocked. The exchange further comprises a first source of current for supplying a pulse with a steep trailing flank and a second source of current for supplying a pulse with a sloping trailing flank. The two current sources are controlled by the marker so that the first source is connected to the line when a connection has been established whereby the memories are transformed to the higher resistance condition and the calling potential ceases. Upon termination of a call the marker connects the second current source to the line whereby the memories are transformed to the low resistance condition thus readying the exchange for another call.

The present invention refers to a circuit arrangement for connecting a subscriber's line to the connection equipment in an automatic telephone exchange wherein a marker establishes the connection through disengaged switching means.

The object of the invention is to simplify the conventional subscriber's line equipment by using simple and less expensive elements of the semi-conducting type, instead of the line relays, cut-off relays and blocking relays heretofore used.

The circuit arrangement according to the invention is principally characterized by providing fɔr each subscriber's line two connection elements with a memory feature which can be transformed from a high resistance condition to a low resistance condition by means of a current pulse with slowly decreasing trailing flank and can be transformed from a low resistance condition to high resistance condition by means of a currnet pulse with steeply decreasing time curve. Such connection elements are incorporated in a circuit that between the poles of a current source runs through the subscriber's line wires and hook contact and comprises a resistance across which the voltage loss at the low resistance condition of the connection elements determines a calling potential, that indicates to the marker the occurrence of a call, and which connection elements in their high resistance condition block said circuit, the exchange comprising a first source for a current pulse with a steep rear flank and a second source for a current pulse with a sloping rear flank, which sources are controlled by the marker in such a way that said first source is connected to the line wire pair when a connection has been established, whereby the connection elements are brought to high resistance condition and the calling potential ceases, while at the termination of a call the marker connects said second source in order to transform the elements to low resistance condition to prepare for another call.

According to a further development of the inventive idea the circuit arrangement comprises an additional connection element with a threshold function that after exceeding of an ignition voltage may be held in the conducting state by means of a current through the elements, provided said current is not diminished below a certain minimum value. The additional connection element is connected partly to a point in the calling circuit, the potential of which indicates a call from the subscriber, and partly to a potential that is lower than the potential necessary to call the marker. The additional connection element at the receipt of a current pulse, transforming the two other connections elements to low resistance condition, becomes conducting and maintains the conducting condition until the hook contact of the subscriber's instrument is opened in order to block the subscriber's line in case of unintentional closure of the hook contact.

Figure 1:
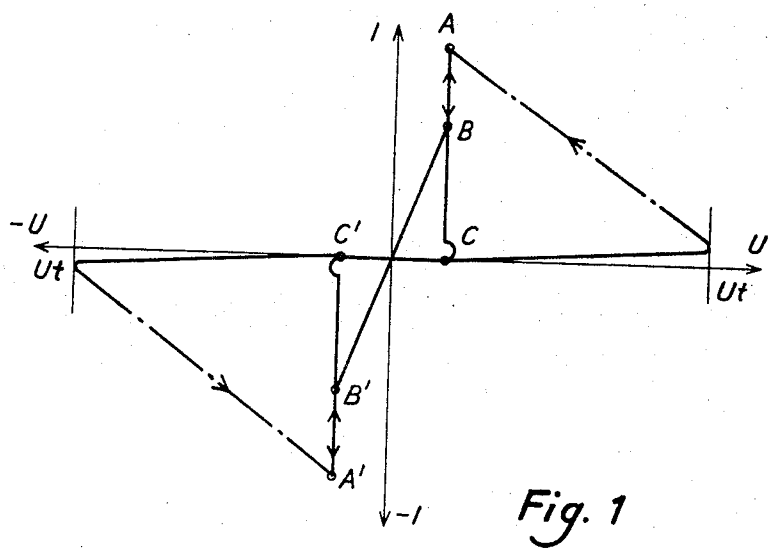
Figure 2:
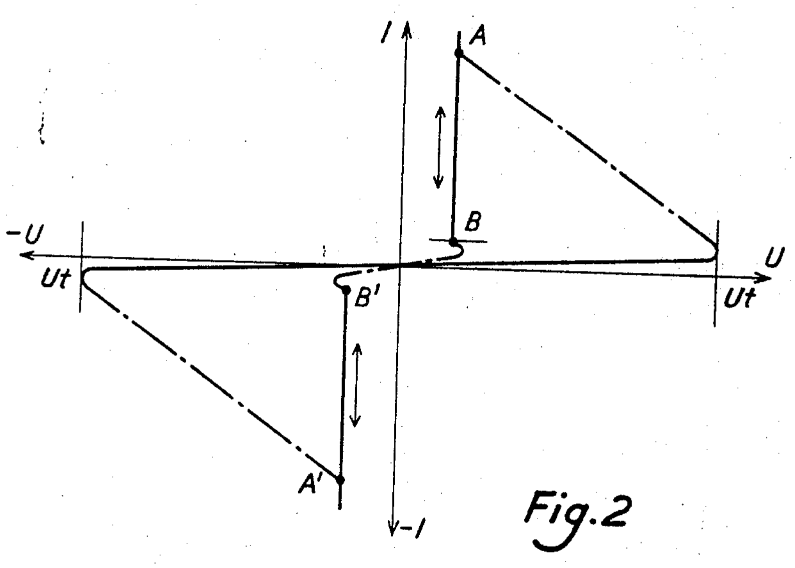
Figure 3:
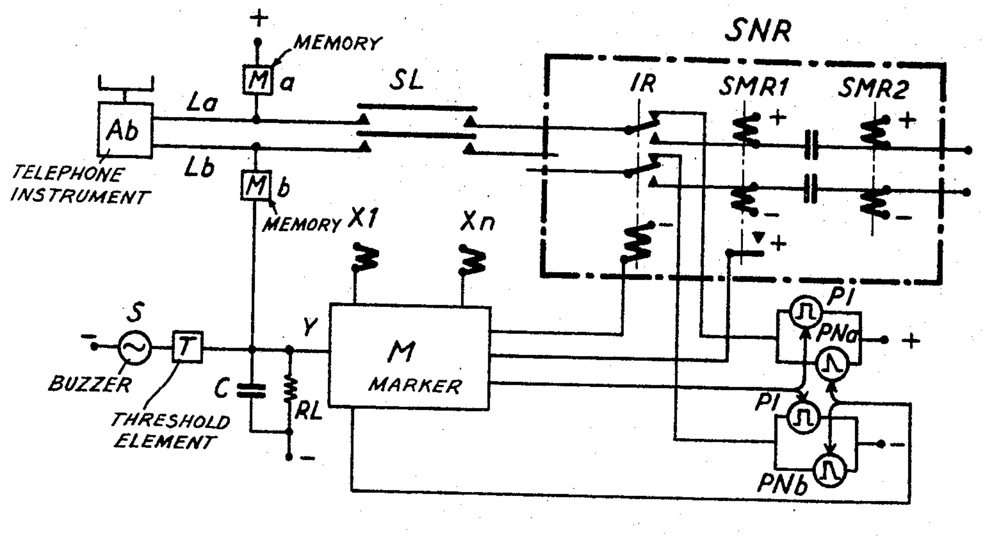

The invention will be further explained by means of an embodiment with reference to the attached drawing in which FIG. 1 is a voltage-current diagram for a connection element with memory properties, FIG. 2 is a voltage-current curve for a connection element with a threshold function, and FIG. 3 shows a simplified connection diagram of the circuit arrangement according to the invention.

The semi-conducting elements normally are in a high resistance state, which is explained by the semi-conducting material thereof sustaining an amorphous condition. Provided the current passes through the semi-conducting, amorphous layer with a sufficiently high density, the layer becomes conducting. The transformation from insulating- to conducting-state occurs when an ignition voltage of for instance 60–70 v. is exceeded, the necessary voltage depending upon the chemical composition of the material. In dependence on the chemical composition of the elements two different types may be distinguished. In the one type, whose voltage-current curve is shown in FIG. 1, the conducting state may be maintained after the ceasing or changing of direction of the current. The element maintains a normal resistance characteristics provided the current flowing therethrough slowly decreases to zero value. At a rapid decrease of the current to zero-value the element is again transformed to high resistance state as is shown in FIG. 1. This element is hereinafter called memory element.

FIG. 2 shows a voltage-current curve for an element of other type in which the conducting state is maintained, after the element has been exposed to the threshold voltage, until the current decreases below a certain lower limit. When the current has passed this lower limit the low resistance state ceases, and the element returns to high resistance state. This element, contrary to the first mentioned element, cannot maintain its low resistance state even if the current should decrease slowly. This element is hereinafter called the threshold element.

FIG. 3 shows a simplified connection diagram for the switching device according to the invention where only those parts are represented that are necessary for the understanding of the idea of the invention. The subscriber unit A*b* is, by means of line wires L*a*, L*b*, connected through a selector stage SL to a cord circuit relay set SNR in the conventional way. M is a marker that selects free switching circuits and establishes a connection between the subscriber and a free cord circuit relay set for further connection to other switching circuits of the exchange. A memory element M$a$ is connected between the positive pole of a direct current source and the line wire L$a$, and a second memory element M$b$ is connected between the line wire L$b$ and the negative pole of the direct current source through a resistance RL. In this way at the closure of the hook contact in the subscriber unit A$b$ a loop is closed. For the low resistance condition of the memory elements the voltage drop in the loop will substantially be determined by the voltage across the resistance RL, so that the voltage in the point Y will substantially correspond to that of the positive pole of the direct current source. In the idle condition of the subscriber's line the memory elements are in their low resistance state, so that at the lifting of the receiver the voltage in the point Y will signal that the subscriber has lifted his phone and thereby the marker is called.

The switching device according to the invention comprises partly the sources PI for current pulses with a steep rear flank and partly sources PN$a$, PN$b$ for current pulses with a sloping rear flank. Recalling what was said above, the first mentioned pulses are adequate for transforming the memory element from a low resistance condition to a high resistance condition and the last mentioned pulses for transforming the memory elements from a high resistance condition to a low resistance condition.

The object of the marker M is to connect the line wires to the corresponding current pulse source when desired to bring the memory elements to the low resistance or the high resistance condition. When the marker receives a calling potential from the subscriber it carries out the connection to a free cord circuit relay set in the conventional way and furthermore causes the feeding of a current pulse with a steep rear flank by sources PI to the line wires through the cord circuit relay set SNR. The memory elements are transformed to the high resistance condition, so that the calling potential to the marker M ceases. This in turn gives the result that a relay IR of the cord circuit relay set is actuated, which relay in the conventional way connects the talking circuit of the subscriber unit to a current feeding relay SMR1, which supplies the feeding current to the subscriber. The feeding relay SMR1 indicates to the marker that the cord circuit is engaged.

When the subscriber hangs up after termination of the conversation the cord circuit relay set becomes disengaged, whereby the contact of the feeding relay SMR1 opens. Consequently the relay IR releases and restores the connection between the subscriber's line wires and the current pulse sources. The marker now actuates the current pulse sources PN, so that a current pulse with a sloping rear flank is connected to each one of the line wires. The low resistance condition of the memory elements is restored and the switching device is ready for the next call.

In order to obtain the blocking feature of the subscriber's equipment, i.e. to prevent the marker from being called in the case of a short circuit of the line or a prolonged unintentional lifting of the subscriber receiver, an element T of the threshold type that performs the function of the conventional blocking relay may be added to the described device. If the subscriber lifts his receiver and within a certain time, for instance 10 seconds, does not dial, the marker M actuates the current pulse sources PN for generating a pulse with a sloping rear flank, so that the low resistance condition of the memory elements are restored. As a consequence also the threshold element T receives an ignition voltage and is changed to a low resistance, connecting the point Y to the negative potential of the current source, so that the marker is released. The current then passes from the positive pole T through the memory element M$a$, line wire L$a$, the subscriber's hook contact, line wire L$b$, memory element M$b$ and through the threshold element T to the negative pole, so that a call to the marker cannot be made as the point Y now is connected to the negative pole. As soon as the short circuit ceases, or the subscriber hangs up, the current is interrupted, whereby the threshold element T returns to its high resistance condition and at the next closing of the hook contact, the point Y again obtains the calling potential. It is convenient to have a source S for buzzer tone connected between one pole of the threshold element T and the negative pole of the voltage source in order to indicate to the subscriber that his line is blocked. A capacitor C is connected in parallel to the resistance RL in order to insure that at the connection moment a sufficiently great current passes through the memory element M$b$. This current pulse ceases as soon as the capacitor C has been charged.

In order to make sure that the threshold element T is transformed to its low resistance condition, the current pulse with a sloping rear flank fed to the line wire L$b$ from the source PN$b$ has such a form that it during a defined time maintains its maximum value before decreasing. It is necessary that the voltage across the threshold element T reaches its ignition voltage signifying that the capacitor C has to be charged to the ignition voltage, before the decrease of the ignition pulse. This is symbolically indicated by the form of the pulse at the pulse source PN$b$.

I claim:

1. In an automatic telephone exchange which includes at least a marker for establishing connections, the marker having an input which receives a voltage to indicate that a call is to be made, and a subscriber unit including at least a receiver switch which closes when a subscriber lifts the receiver and a pair of output line wires connected to the receiver switch, the improvement comprising a D-C voltage source having first and second output terminals, first and second memory elements of semiconductor material, said solid state semiconductor material in one state having at least portions thereof in one structural state which is of high resistance and constitutes substantially an insulator for blocking the flow of current therethrough in either direction when an applied voltage is below an upper ignition threshold voltage level, and in another state having at least portions thereof in another structural state which is of low resistance and constitutes substantially a conductor for conducting the flow of current therethrough in either direction when the applied voltage is raised above said upper threshold level and then is slowly reduced to zero voltage level, said portions of said solid state semiconductor material being controlled and substantially instantaneously changed from said blocking structural state to said conducting structural state by the imposition of a D-C pulse of any polarity above said upper threshold voltage level and being reverted to said blocking structural state by an instantaneous reduction of the imposed pulse to zero voltage, said first memory element being connected between the first terminal of said D-C voltage source and one of the line wires, said second memory element being connected between the call voltage input of the marker and the other of the line wires, a resistor connected between said call voltage input and the second terminal of said D-C voltage source so that when the memory elements are in the low resistance condition and the receiver switch is closed a call voltage is present at said call voltage input to indicate to the marker that the subscriber unit is in a calling condition, a first D-C pulse source for generating a current pulse having a peak voltage above said threshold voltage and a steep rear flank, a second D-C pulse source for generating a current pulse with sloping rear flank, said marker including first means for connecting said first pulse source to said line wires to switch said memory elements to the high resistance condition and therefore to remove the call voltage at said call voltage input for suspending the calling condition, and said marker including second means for connecting said second pulse source to said line wires to switch said memory elements to the low resistance condition at the end of a call.

2. The apparatus of claim 1 further comprising a threshold element of solid state semiconductor material, said solid state semiconductor material in one state having at least portions thereof in one structural state which is of high resistance and constitutes substantially an insulator for blocking the flow of current therethrough in either direction when an applied voltage is below an upper threshold voltage level, and in another state having at least portions thereof in another structural state which is of low resistance and constitutes substantially a conductor for conducting the flow of current therethrough in either direction when the applied voltage is raised above an upper threshold voltage level and subsequently maintained above a lower threshold voltage level, said portions of said solid state semiconductor material being controlled and substantially instantaneously changed from said blocking structural state to said conducting state by the imposition of a D-C pulse of any polarity above said upper threshold voltage level and being reverted to said blocking structural state by a reduction of the current therethrough to zero level, said threshold element being connected between said second source of voltage and the call signal input of the marker, the amplitude of the voltage of said second source of D-C voltage being such that the difference between said voltage and the call voltage at least equals said upper threshold voltage level, said threshold element being transformed to said low resistance condition when the call voltage is present and said second current pulse source is connected to said line wires to switch said memory elements to the low resistance condition and then said threshold element being maintained in said low resistance condition as long as current flows through said memory elements.

3. The apparatus of claim 2 further comprising a capacitor connected across said resistor, and wherein said second current pulse source generates pulses that have a maximum amplitude for a time interval sufficiently long to charge said capacitor to said upper ignition voltage level before the onset of the sloping trailing flank.

References Cited

UNITED STATES PATENTS

| | | | |
|---|---|---|---|
| 3,086,083 | 4/1963 | Feder | 307—258 |
| 3,271,591 | 9/1966 | Ovshinsky | 307—258 |

KATHLEEN H. CLAFFY, *Primary Examiner.*

LAURENCE A. WRIGHT, *Assistant Examiner.*